Patented Oct. 12, 1943

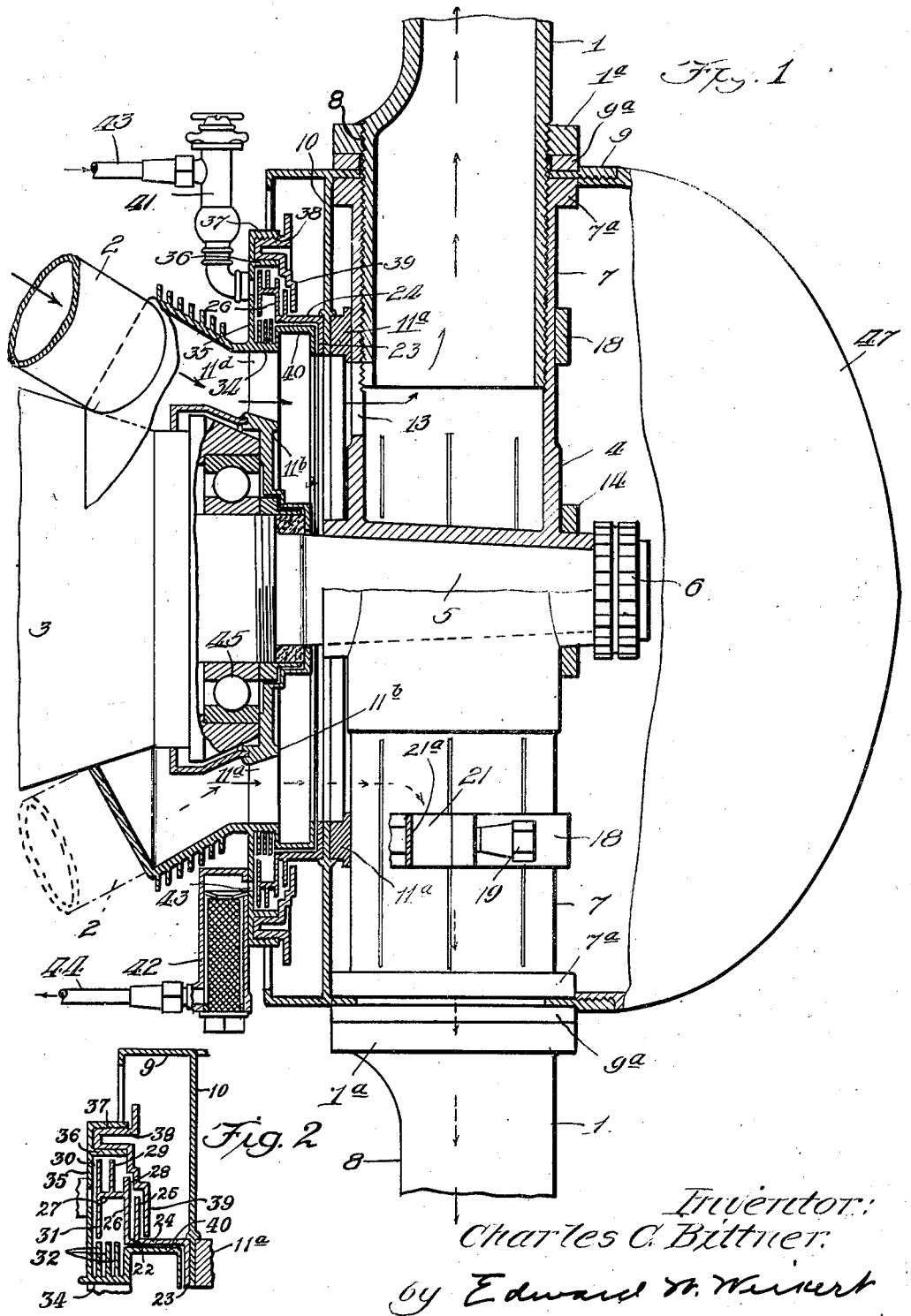

2,331,649

UNITED STATES PATENT OFFICE 2,331,649

VACUUM-TIGHT COUPLING JOINT FOR ENGINES AND THE LIKE

Charles C. Bittner, Chicago, Ill., assignor of one-twentieth to Wilbur S. Trader, Chicago, Ill., and one-third to Fred Burt Application February 17, 1941, Serial No. 379,253

3 Claims. (Cl. 286—9)

This invention relates to a vacuum tight coupling joint primarily designed for use between internal combustion engines and a vacuum producing medium for drawing off the exhaust, but adapted for other uses.

In the past attempts have been made to use mechanical joints for such a purpose but the high excessive rate of self-destruction of such joints made it impossible to put them into use. Further in prior devices the centrifugal force in the propeller blades has not been made effective as an aid to the vacuum.

According to my invention, I dispense with mechanical joints and avoid all heat and abrasion arising from packed joints and contacts and employ on the other hand, a hydraulic joint in which centrifugal force is utilized to create a vacuum tight liquid seal by creating a substantially solid ring of oil between the relatively rotatable parts.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 1 is a sectional view taken thru a vacuum tight coupling involving this invention.

Fig. 2 is an enlarged fragmentary sectional view of the race way and annulus.

In referring now to the drawing, it will be noted that the invention has been illustrated in connection with hollow propellers 1 of an airplane which may be taken as the vacuum producing means for withdrawing the exhaust from the manifolds 2 of an internal combustion engine 3 which may be of any suitable type or design.

The invention, however, concerns itself more particularly with the creation of a vacuum tight seal that is free of the elements of destruction between a rotatable member which may be a propeller hub and a stationary member associated with some power unit such as an engine.

The propeller hub or drum generally denoted by the reference 4 is secured upon the forward end of the engine shaft 5 by the nuts 6. This hub 4 has two diametrically opposite socket members 7 which are provided with arcuate collars 7a at their outer ends that fit tightly against the drum 9 of the hub. Hollow shanks 8 of the propeller blades 1 are threaded into the sockets 7 as shown in Fig. 4, and they extend through suitable openings in the drum member 9. An arcuate collar 9a surrounds the propeller shank and fits tightly against the drum 9. A nut 7a threaded on the shank is forced against the collar 7a. A circular web or flange 10 extends inwardly from the drum 9, in the form of a flat ring which is braced by a reinforcing ring or spider 11a. The exhaust of the engine is designed to be drawn through the ring 11 into the propeller drum. This exhaust passes from the engine manifolds 2 through apertures 11d formed in the circular engine end plate 11b as shown in Fig. 4. It will be noted that the apertures 11d are in the form of a circular series. Certain of the apertures 11d register with openings 13 in the sockets 7.

To further reinforce the hub structure, the ring 11 is clamped against the socket members 7 by means of the arcuate bridging pieces 18 upon the opposite sides of the socket members 7 through which bolts 19 extend that engage lugs 21 on the sockets 7. It will be understood that the propeller hub 4 with its reinforcing ring 11a rotates with the engine shaft 5. In its rotation, it carries with it a centrifugal force producing annulus 22 which has a vertical flange 23 attached to the web 10 of the hub upon the opposite side of ring 11a. The attaching flange 23 terminates in a horizontal ring portion 24 provided with an intermediate fin 25 and a terminal vertically directed flange 26. The flange 26 terminates in a horizontal web 27 from which three spaced vertical fins 28, 29 and 30 extend. The fins 28, 29 and 30 extend outwardly of web 27. In alignment with fin 30, there is an inwardly directed fin 31 that extends parallel to flange 26 and that approaches the top of one of the three spaced fins 32 on the circular engine collar 34 that forms part of the exhaust manifolds 2.

This manifold ring has a vertical flange 35 that extends outwardly in close proximity to the fins just described and also thereabove where it is provided with a pair of laterally extending flanges 36 and 37, the latter of which is internally threaded. The flanges 36 and 37 extend in the same direction in parallel relation and form a groove therebetween for receiving a rib 38 on a plate 39. The rib 38 is externally threaded for receiving the threads on the flange 37. It will be noted that the plate 39 is stepped in a direction toward the propeller hub and approaches the horizontal ring portion 24 of the centrifugal annulus 22.

Thus it will be seen that the flange 35 in cooperation with the plate 39 forms an annular groove or pocket in which the centrifugal annulus 22 rotates. It will also be noted that the engine ring or flange 34 terminates in an outwardly extending right angled portion 40 that cooperates with flange 35 for forming a groove for the fins 32 that parallels the flanges 24 and 23 of the centrifugal annulus 22. An inlet faucet 41 for liquid preferably oil is attached to the flange 35 for discharging a liquid into the upper part of the groove in which the centrifugal annulus rotates, while at the lower portion of the groove, there is a drain or overflow receiving well 42 that communicates through an opening 43 in flange 35 with said groove. The faucet 41 and well 42 are shown with pipes 43 and 44 extending therefrom and which may lead to a lubricating pump or the like (not shown).

The engine shaft 5 may be supported in a suitable ball bearing structure 45 which is suitably sealed as shown. Upon diametrically opposite points of the ball bearing, there extend the exhaust manifolds 2 of the engine which discharge into the collecting chamber formed by drum part 9 and the end closure 47 and into the sockets 7 through the openings 11d and 13 as shown by the arrows in Fig. 4. The exhaust finally passes longitudinally through the hollow propeller blades.

The outer end of the drum-like hub which is tightly closed by the dome or cap 47 threaded into the outer end of the drum 9 as shown in Fig. 4 forms a vacuum tight collection chamber for receiving exhaust gases through the orifices 11d. From this chamber, the gases enter the sockets 7. As the drum part 9 of the hub is subjected to pressure from without due to the vacuum therein, it requires the bracing shown and described.

It will be understood that the annular flange 35 on the engine or stationary member and the plate 39 together with the engine part 34 form a substantially enclosed race way in which a liquid such as oil can be confined or trapped. The fins 32 in the bottom of the race way tend to prevent the oil from finding its way into the propeller hub. It will also be noted that the centrifugal force producing annulus 22 rotates in this substantially enclosed race way and that its laterally extending flange 24 with its attaching portion 23 secured to the drum web 10, provides an offset relation between the annulus and such web. This construction makes it possible to use a substantially enclosed race way having both a top and a bottom with only a lateral slit for receiving the flange 24 of the annulus.

A suitable oil is preferably used as the vacuum tight sealing medium. A suitable amount of such oil may be put in the race way through the inlet faucet 41. If the rotating member including the propeller hub is still, the oil will naturally gravitate down into the bottom of the race way where any overflow will enter the well 42. It will, of course, be understood that at such times there is no sealing relation between the stationary member such as the engine and the rotary member such as the propeller hub or vacuum producing member. However, as soon as the shaft 5 of the internal combustion engine starts to rotate, the annulus 22 which rotates therewith will lift the oil and through centrifugal action force it against the outer surface of the race way so that a thick film or ring of oil is formed between the outer cylindrical surface of the race way and the annulus. Due to the fins on the annulus, such ring of oil will be easily sustained and confined in position to form a vacuum tight seal between the stationary member and the rotary member. During sufficiently rapid rotation and centrifugal action, this sealing film or ring of oil may become a sufficiently tough or solid medium to appreciably resist penetration by a tool or the like.

I am aware that many changes may be made and various details of construction may be varied without departing from the principles of this invention and I do not propose limiting the patent granted thereon otherwise than necessitated by the prior art and appended claims.

I claim as my invention:

1. In a device of the class described, a stationary member having an annular flange extending therearound in a radial plane, said flange having spaced parallel and laterally extending elements forming a groove therebetween, one of said elements being threaded, a plate extending substantially parallel with said flange and having a rib extending into and threaded in said groove, said flange, plate and stationary member forming a liquid confining race way, a centrifugal force producing annulus in said race way and having a laterally extending flange at one side of said race way, and a rotary drum-like member having an inwardly extending web secured to said laterally extending flange.

2. Means for providing a vacuum tight seal between a rotary member and a stationary member comprising a substantially enclosed oil confining race way in the stationary member, said race way having an outer annular surface adapted for receiving oil through centrifugal action and having a circular slot in one side wall, and a centrifugal force producing annulus in said race way, said annulus having an outer circular rim with spaced fins directed toward said outer annular surface, and a laterally extending annular flange extending through said slot, a rotary member connected to said flange, and means for introducing oil into said race way whereby the rotation of said annulus will form a substantially solid ring of oil between said outer surface of the race way and the rim of said annulus, said ring of oil being confined by said fins.

3. Means for providing a vacuum tight seal between a rotary member and a stationary member comprising a substantially enclosed oil confining race way in the stationary member, said race way including an outer annular surface adapted for receiving oil thru centrifugal action, a rotary annulus in said race way having a circular rim spaced from said annular surface, the circular space between said rim and annular surface being adapted to be sealed by a substantially solid ring of oil supported on said rim, means on said rim adapted for retaining said ring of oil, a rotary member and means on said annulus extending laterally from said race way and attached to said rotary member.

CHARLES C. BITTNER.